United States Patent
Lipton et al.

(10) Patent No.: US 9,258,297 B2
(45) Date of Patent: Feb. 9, 2016

(54) METHODS, DEVICES, AND MEDIUMS FOR SECURELY SHARING RESTRICTED CONTENT

(71) Applicants: Paul Alexander Lipton, Kitchener (CA); Mohannad A K Hussain, Waterloo (CA); Ronald James Leisti, Kitchener (CA)

(72) Inventors: Paul Alexander Lipton, Kitchener (CA); Mohannad A K Hussain, Waterloo (CA); Ronald James Leisti, Kitchener (CA)

(73) Assignee: AGFA HEALTHCARE, Toronto (CA)

( * ) Notice: Subject to any disclaimer, the term of this patent is extended or adjusted under 35 U.S.C. 154(b) by 135 days.

(21) Appl. No.: 14/010,924

(22) Filed: Aug. 27, 2013

(65) Prior Publication Data
US 2015/0067327 A1  Mar. 5, 2015

(51) Int. Cl.
| H04L 9/32 | (2006.01) |
| H04L 29/06 | (2006.01) |
| G06F 9/455 | (2006.01) |

(52) U.S. Cl.
CPC .......... *H04L 63/083* (2013.01); *H04L 63/0428* (2013.01); *G06F 9/45525* (2013.01)

(58) Field of Classification Search
CPC .............. H04L 63/0428; H04L 63/083; G06F 9/45525
USPC .......................................... 713/168; 726/2, 5
See application file for complete search history.

(56) References Cited

U.S. PATENT DOCUMENTS

| 5,497,421 | A  * | 3/1996 | Kaufman et al. ............. 713/156 |
| 7,249,107 | B2 * | 7/2007 | Yaacovi ........................... 705/59 |
| 7,315,950 | B1 * | 1/2008 | Baransky et al. ............. 713/193 |
| 7,702,730 | B2 * | 4/2010 | Spataro ............ G06F 17/30011 709/205 |
| 7,725,723 | B2 * | 5/2010 | Landrock et al. ............. 713/176 |
| 8,540,149 | B1 * | 9/2013 | Chu ............................... 235/380 |
| 8,756,673 | B2 * | 6/2014 | Barrus et al. ....................... 726/9 |
| 8,806,567 | B1 * | 8/2014 | Venable, Sr. ....................... 726/1 |
| 2008/0256615 | A1* | 10/2008 | Schlacht et al. ................... 726/9 |
| 2010/0121954 | A1* | 5/2010 | Yang et al. ..................... 709/225 |
| 2012/0321083 | A1* | 12/2012 | Phadke et al. ................. 380/255 |
| 2013/0060579 | A1 | 3/2013 | Yu et al. |
| 2013/0179692 | A1* | 7/2013 | Tolba et al. .................... 713/179 |
| 2013/0268627 | A1* | 10/2013 | Lee .......................... G06F 9/541 709/217 |
| 2013/0305328 | A1* | 11/2013 | Leung ................................ 726/6 |
| 2014/0198335 | A1* | 7/2014 | Atmakur ...................... 358/1.14 |

* cited by examiner

*Primary Examiner* — Samson Lemma

(74) *Attorney, Agent, or Firm* — Bereskin & Parr LLP; Isis E. Caulder

(57) ABSTRACT

A computing device is disclosed for securely sharing restricted content. The computing device includes a memory storing computer readable instructions, and one or more processors configured to execute the computer readable instructions. The computer readable instructions configure the one or more processors to, collectively, receive a share request to share the restricted content; in response to the share request, encode a link with encrypted access information, the access information including a first password and identifying the restricted content; receive an access request for access to the restricted content from a client device executing the link, the access request including the encrypted access information; receive a second password from the client device in association with the access request; and grant the client device access to the restricted content in response to determining the first password matches the second password. A method and a computer readable medium are also disclosed.

20 Claims, 7 Drawing Sheets

METHODS, DEVICES, AND MEDIUMS FOR SECURELY SHARING RESTRICTED CONTENT

FIELD

Embodiments described herein relate to the field of methods, devices, and computer-readable mediums for securely sharing restricted content.

INTRODUCTION

In many environments, users share electronic information, such as documents and images, by sending emails, or other message forms, to which a copy of the shared electronic information is attached. However, sharing copies of electronic information in this manner may provide limited control over the access to the electronic information. Moreover, it may be inconvenient for a recipient of electronic information shared in this manner to share with the sender changes, comments or other annotations to the shared electronic information. For example, the recipient may send an e-mail, attaching a revised copy of the shared electronic information, to the sender who may need to manually merge the revisions with the local copy of the electronic information. In some cases, the sender may need to reconcile the received revisions with inconsistent revisions made to the local copy in the time since the electronic information was shared with the recipient.

SUMMARY

In a first aspect, a computing device is provided for securely sharing restricted content. The computing device may include a memory storing computer readable instructions, and one or more processors configured to execute the computer readable instructions. The computer readable instructions may configure the one or more processors to collectively: receive a share request to share the restricted content; in response to the share request, encode a link with encrypted access information, the access information including a first password and identifying the restricted content; receive an access request for access to the restricted content from a client device executing the link, the access request including the encrypted access information; receive a second password from the client device in association with the access request; and grant the client device access to the restricted content in response to determining that the first password matches the second password.

In some embodiments, determining that the first password matches the second password may include decrypting the first password from the encrypted access information received in the access request, and comparing the decrypted first password to the second password.

In some embodiments, determining that the first password matches the second password may include decrypting the first password from the encrypted access information received in the access request, hashing the second password to generate a second password hash, and comparing the decrypted first password to the second password hash.

In some embodiments, the encrypted access information may include one or more access rights for the restricted content, and the access may be limited to the one or more access rights.

In some embodiments, configuring the one or more processors to collectively grant the client device the access may include configuring the one or more processors to collectively decrypt the one or more access rights from the encrypted access information received in the access request, and grant the client device the access limited to the decrypted one or more access rights.

In some embodiments, the encrypted access information may define a time window, and the access is limited to the time window.

In some embodiments, the computer readable instructions may further configure the one or more processors to collectively revoke the granted access upon expiry of the time window.

In some embodiments, configuring the one or more processors to collectively grant the client device the access may include configuring the one or more processors to collectively grant the client device access to the restricted content in response to determining, both of the first password matches the second password, and the time window is still valid.

In some embodiments, the computer readable instructions may further configure the one or more processors to collectively communicate the link to the client device.

In some embodiments, the link may be a two dimensional bar code.

In another aspect, a computer-readable medium is provided. The computer-readable medium may include instructions executable by one or more processors, wherein the instructions when executed may configure the one or more processors to collectively receive a share request the restricted content; in response to the share request, encode a link with encrypted access information, the access information including a first password and identifying the restricted content; receive an access request to the restricted content from a client device executing the link, the access request including the encrypted access information; receive a second password from the client device in association with the access request; and grant the client device access to the restricted content in response to determining that the first password matches the second password.

In some embodiments, determining that the first password matches the second password may include decrypting the first password from the encrypted access information received in the access request, and comparing the decrypted first password to the second password.

In some embodiments, determining that the first password matches the second password may include decrypting the first password from the encrypted access information received in the access request, hashing the second password to generate a second password hash; and comparing the decrypted first password to the second password hash.

In another aspect, a method of securely sharing restricted content is provided. The method may include receiving a share request the restricted content; in response to the share request, encoding a link with encrypted access information, the access information including a first password and identifying the restricted content; receiving an access request to the restricted content from a client device executing the link, the access request including the encrypted access information; receiving a second password from the client device in association with the access request and granting the client device access to the restricted content in response to determining that the first password matches the second password.

In some embodiments, determining that the first password matches the second password may include decrypting the first password from the encrypted access information received in the access request, and comparing the decrypted first password to the second password.

In some embodiments, determining that the first password matches the second password may include decrypting the first password from the encrypted access information received in the access request, hashing the second password to generate a second password hash, and comparing the decrypted first password to the second password hash.

In some embodiments, the encrypted access information may include one or more access rights for the restricted content, and the access is limited to the one or more access rights.

In some embodiments, granting the client device the access may include decrypting the one or more access rights from the encrypted access information received in the access request, and granting the client device the access limited to the decrypted one or more access rights.

In some embodiments, the encrypted access information may define a time window; and the access is limited to the time window.

In some embodiments, the method may also include revoking the granted access upon expiry of the time window.

In some embodiments, the method may also include configuring the one or more processors to collectively grant the client device access to the restricted content in response to determining, both of the first password matches the second password, and the time window is still valid.

In some embodiments, the method may also include communicating the link to the client device.

DRAWINGS

DESCRIPTION OF VARIOUS EMBODIMENTS

Figure 1:
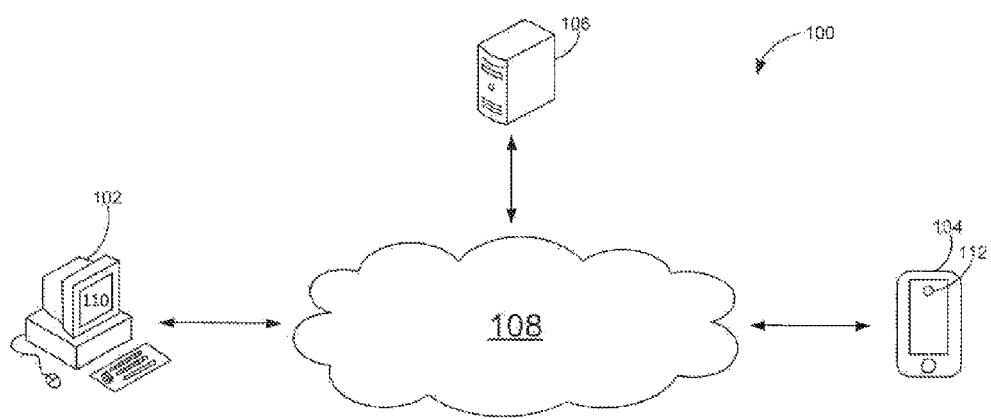
FIG. 1 shows an example system for sharing restricted content, in accordance with at least one embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article may be used in place of a single device/article. Similarly, where more than one device or article is described herein (whether or not they cooperate), it will be readily apparent that a single device/article may be used in place of the more than one device or article.

In some cases, access to electronic information is shared by registering a new account (e.g. a guest account) with access rights for a selected user, and providing that user with credentials to log-in to the new account. This may permit multiple users to access, and potentially provide revisions to, a common copy of the electronic information thereby avoiding some revision management problems. However, it may be inconvenient to register new accounts and manage access rights on existing accounts, to provide or revoke access to electronic information to/from users. Moreover, it may be inconvenient to manage a collection of user accounts, which may require frequent auditing to remove inactive accounts and access rights that should have been since revoked.

In some embodiments described in more detail below, a trusted device sends a share request to a server device requesting to share restricted content with an outside device. In some cases, the server device responds to the share request by encoding a link with encrypted access information, which identifies the restricted content and a password. In this example, the link is communicated to the outside device, e.g. via a network.

Continuing the example, the outside device can execute the link to send an access request to the server device, requesting access to the restricted content, the access request including the encrypted access information. In some embodiments, the outside device also sends a password to the server device as part of the access request or when prompted. In some cases, the server device grants the outside device access to the restricted content if the password received from the outside device matches the password in the encrypted access information. This may permit restricted content to be shared with the outside device, without creating or modifying a stored user account, by providing a link encoded with encrypted access information. The server device may rely on the encrypted access information, instead of a stored user account, to determine whether to grant the outside device access to the restricted content.

FIG. 1 shows an example system 100 for sharing restricted content, including client devices 102 and 104, a server device 106, and a network 108. In the example shown, client devices 102 and 104, and server device 106 are communicatively coupled (wired or wirelessly) via a network 108, such as the Internet or a local area network (LAN) for example. In alternative embodiments, any two or more of client devices 102 and 104 and server device 106 are communicatively coupled by a wired or wireless connection that does not form a network. In one example, client device 102 includes a display 110 that can display information (e.g. an image, barcode or textual document) and client device 104 includes a camera 112 that can capture information as displayed on display 110. In this example, the mode of communication (display and capture) is one-directional from display 110 of client device 102 to camera 112 of client device 104. In other examples, such as a direct wired connection (e.g. by universal serial bus (USB)) or a direct wireless connection (e.g. by infrared (iR)), the communication can be two-directional.

As used herein, and in the claims, "restricted content" is electronic information to which at least one access right (e.g. read, write, delete, copy, move, rename, or annotate) is restricted. In some examples, the access right is restricted to one or more of an authenticated user, a client device, and a time window.

Figure 2:
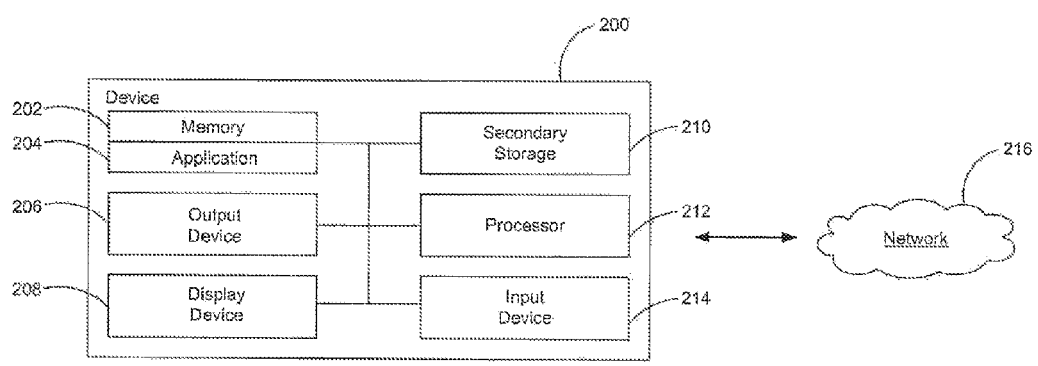
FIG. 2 shows an example schematic of a device, in accordance with at least one embodiment.

FIG. 2 shows an example schematic of a device 200, in accordance with at least one embodiment. As shown, device 200 is generally illustrated as having hardware components, which can be used by one or more of the elements of system 100, such as client device 102, client device 104, and server device 106. Generally, a device 200 can be a server computer, desktop computer, notebook computer, tablet, PDA, smartphone, or another computing device. In at least one embodiment, device 200 includes a connection with a network 216 such as a wired or wireless connection to the Internet or to a private network. In some cases, network 216 includes other types of computer or telecommunication networks. Network 216 may correspond with network 108 shown in FIG. 1.

In the example shown, device 200 includes a memory 202, an application 204, an output device 206, a display device 208, a secondary storage device 210, a processor 212, and an input device 214. In some embodiments, device 200 includes multiple of any one or more of memory 202, application 204, output device 206, display device 208, secondary storage device 210, processor 212, and input device 214. In some embodiments, device 200 does not include one or more of applications 204, second storage devices 210, network connections, input devices 214, output devices 206, and display devices 208.

Memory 202 can include random access memory (RAM) or similar types of memory. Also, in some embodiments, memory 202 stores one or more applications 204 for execution by processor 212. Applications 204 correspond with software modules including computer executable instructions to perform processing for the functions and methods described below. Secondary storage device 210 can include a hard disk drive, floppy disk drive, CD drive, DVD drive, Blu-ray drive, solid state drive, flash memory or other types of non-volatile data storage.

In some embodiments, device 200 stores information in a remote storage device, such as cloud storage, accessible across a network, such as network 216 or another network. In some embodiments, device 200 stores information distributed across multiple storage devices, such as memory 202 and secondary storage device 210 (i.e. each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 212 can execute applications, computer readable instructions or programs. The applications, computer readable instructions or programs can be stored in memory 202 or in secondary storage 210, or can be received from remote storage accessible through network 216, for example. When executed, the applications, computer readable instructions or programs can configure the processor 212 (or multiple processors 212, collectively) to perform the acts described herein with reference to client device 102, client device 104 or server device 106, for example.

Input device 214 can include any device for entering information into device 200. For example, input device 214 can be a keyboard, key pad, cursor-control device, touch-screen, camera, or microphone. Input device 214 can also include input ports and wireless radios (e.g. Bluetooth®, or 802.11x) for making wired and wireless connections to external devices.

Display device 208 can include any type of device for presenting visual information. For example, display device 208 can be a computer monitor, a flat-screen display, a projector or a display panel.

Output device 206 can include any type of device for presenting a hard copy of information, such as a printer for example. Output device 206 can also include other types of output devices such as speakers, for example. In at least one embodiment, output device 206 includes one or more of output ports and wireless radios (e.g. Bluetooth®, or 802.11x) for making wired and wireless connections to external devices.

FIG. 2 illustrates one example hardware schematic of a device 200. In alternative embodiments, device 200 contains fewer, additional or different components. In addition, although aspects of an implementation of device 200 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Figure 3:
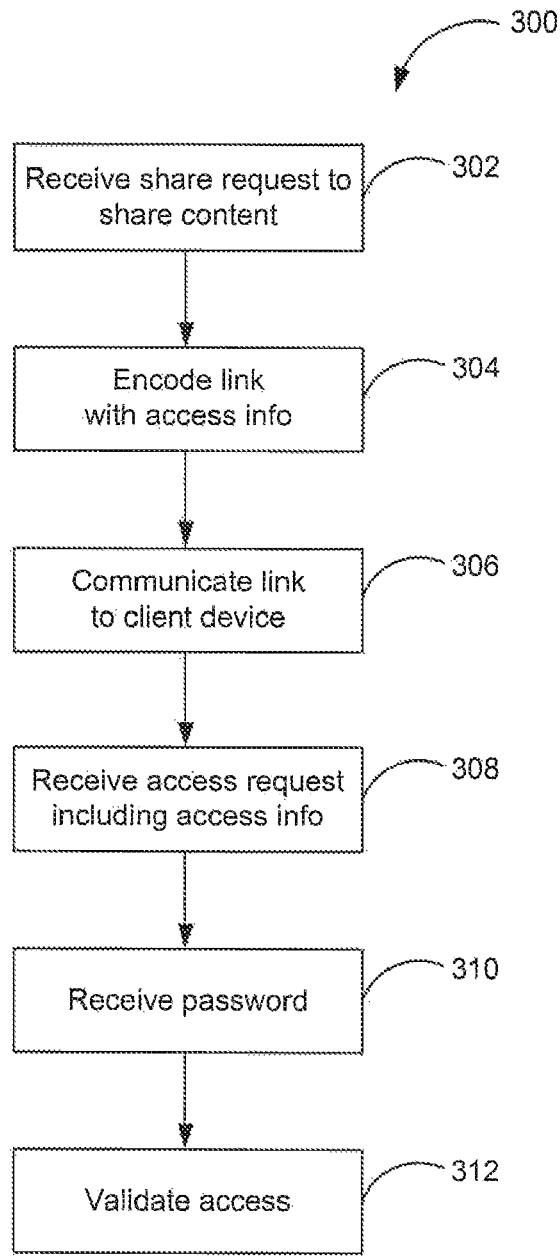
FIG. 3 shows a flowchart illustrating a method for securely sharing restricted content, in accordance with at least one embodiment.

FIG. 3 shows a flowchart illustrating a method 300 for securely sharing restricted content, in accordance with at least one embodiment. For clarity of illustration, method 300 is described below with reference to system 100. Further, client devices 102 and 104 are hereinafter referred to as trusted device 102 and outside device 104. Method 300 is not limited to the use of system 100 and the devices 102, 104, and 106 therein, and can be practiced using any suitable apparatus.

Further the flowchart shown in FIG. 3 illustrates the steps of method 300 organized in a particular order. However, method 300 is not limited to the steps ordered as shown, and in some embodiments of method 300 some steps are practiced in a different order and some steps are practiced simultaneously. Further, in some embodiments of method 300 one or more of the steps shown is omitted altogether.

At 302, server device 106 receives a share request, sent by trusted device 102, to share (i.e. grant certain access rights) selected restricted content in accordance with some embodiments. In some examples, the selected restricted content is stored by server device 106. In one such example, server device 106 is a medical server which stores a plurality of client studies, where each study includes medical information (e.g. diagnoses) and images (e.g. MRI scans) for a patient. In this example, server device 106 receives a share request from trusted device 102 requesting to grant certain access right to one or more client studies, or to one or more portions (e.g. images) of a client study.

In some embodiments, trusted device 102 is a client device that has access to the selected restricted content. Trusted device 102 has in one example been previously authenticated to a user account to which access to the selected restricted content is authorized. Trusted device 102 has in other examples access to the selected restricted content because of the network address of trusted device 102 (e.g. domain), or because of a hardware identifier of trusted device 102 (e.g. a media access control (MAC) address).

Figures 4, 5:
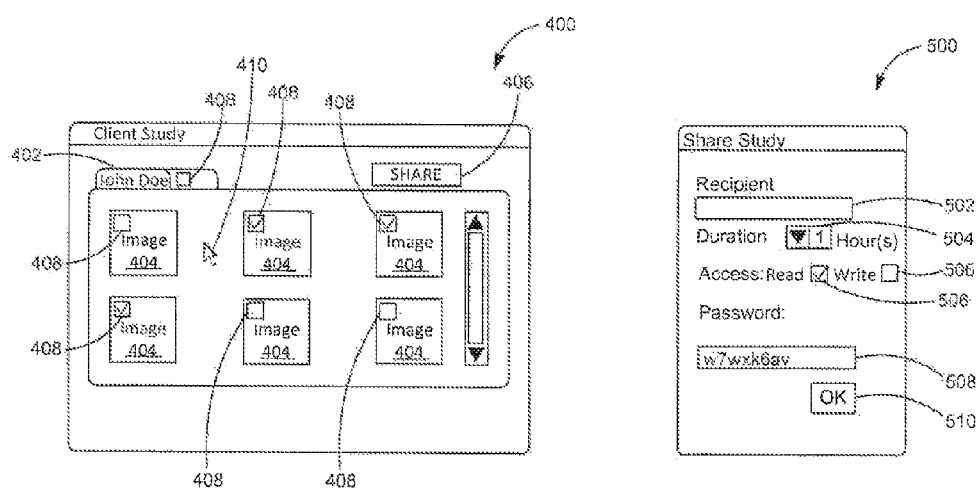
FIG. 4 shows a screen capture of a client study user interface window, in accordance with at least one embodiment.
FIG. 5 shows a screen capture of a share study user interface window, in accordance with at least one embodiment.
Figure 6:
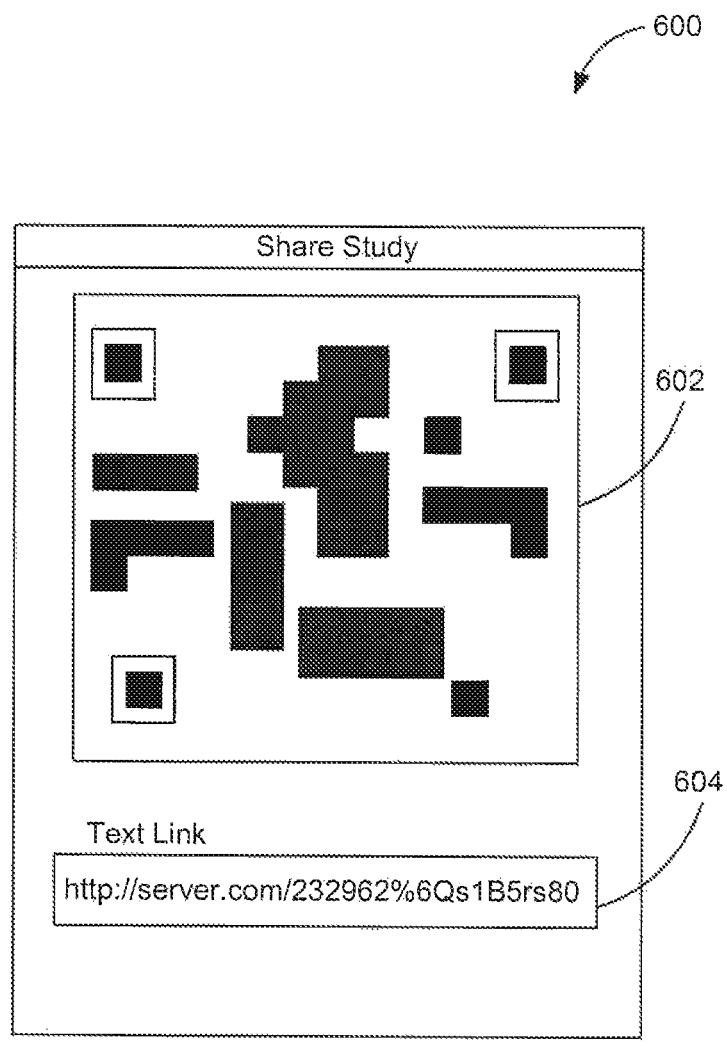
FIG. 6 shows a screen capture of a link communicating user interface window, in accordance with at least one embodiment.

FIGS. 4 and 5 show example screen captures of user interface windows 400 and 500 for selecting restricted content to share, entering access information, and sending a share request to share the selected restricted content. In some examples, one or more of trusted device 102, server device 106, and another remote device (not shown, e.g. a remote storage device) stores the selected restricted content.

In some embodiments, user interface windows described herein are the product of computer readable instructions executed by one or more processors of a device, which collectively control a display (e.g. computer monitor, or integrated LCD display) to visually present that user interface window. In some cases, one or more elements of a user interface window described below is persistently shown on the display (e.g. by an element positioned in front of the display) independent of control by the one or more processors. In some cases, one or more elements of a user interface window described below is substituted by a separate hardware element (e.g. another display or a depressible button) located on the display, elsewhere on the device, or on another device (e.g. wireless mouse) communicatively coupled to the device.

FIG. 4 shows a screen capture of a client study user interface window 400, in accordance with at least one embodiment. In some embodiments, client study user interface window 400 is displayed on display 100 of trusted device 102. In the example shown, client study user interface window 400 includes a tab 402 which shows the contents of a client study for a patient named "John Doe". As shown, the client study includes medical images 404. A client study in some cases can alternatively or additionally include other content, such as patient information (e.g. address, height, weight, prescribed medication, medical test results, reported symptoms, diagnoses etc.), audio and video recordings for example. In this example, one or more of client study 402, and its contents 404 is restricted content to which trusted device 102 but not outside device 104 has access.

Client study user interface window 400 is shown including a "Share" button 406. Further, tab 402, and medical images 404 are shown including selectable check boxes 408. In the example shown, a user of trusted device 102 can select one or more of check boxes 408 (e.g. by navigating cursor 410 with a mouse/touchpad, or by interacting with a touchscreen) to choose the entire patient study or one or more medical images 404 to share. Subsequently, in this example, the user of trusted device 102 can select share button 406 to share the selection (e.g. the entire patient study, or one or more selected medical images 404) with a recipient. In some examples, selecting share button 406 opens the share study user interface window 500 shown in FIG. 5.

FIG. 5 shows a screen capture of a share study user interface window 500 in accordance with at least one embodiment. In some embodiments, the share study user interface window 500 provides some of the access information that is later encrypted and encoded by server device 106 into a link.

In the example shown, share study user interface window 500 includes a recipient entry field 502 for entering the recipient with whom to share the selected restricted content. In some examples, the recipient is entered as an email address, a Facebook™ username, a Twitter™ username, or another communication address. This may permit, the link to be sent to the identified recipient, after the link is encoded, automatically without user input. In alternative embodiments, share study user interface window 500 does not include a recipient entry field.

User interface window 500 is also shown including a selectable time window control 504 (e.g. drop-down box, combo box, or text entry field). In some embodiments, a user can operate an input device to manipulate time window control 504 to identify a time window for the shared access. The time window in some examples is identified by one or more of a duration (e.g. in years, months, days, hours, minutes, and/or seconds), a start time (e.g. a calendar date and optionally time of day), and an end time (e.g. a calendar date and optionally time of day). In some embodiments, time window control 504 prohibits the selection of a time window exceeding one or more of a threshold duration, start time or end time. This may in some cases prevent access to restricted content from being shared in perpetuity, which may frustrate access control policies. In alternative embodiments, user interface window 500 does not include duration control 504, the time window is not selectable, and/or a default or policy-based time window is applied automatically.

In the example shown, user interface window 500 includes a plurality of selectable access rights controls 506. A user of some embodiments can operate an input device to manipulate access rights controls 506 to select or deselect one or more access rights to grant in respect of the selected restricted content. As shown, each access rights control 506 is a check box. In other examples, one or more access rights controls 506 is a different type of control, such as a drop-down box, a combo box, or a text entry field for example. The access rights that in some embodiments form part of the access information (that is later encrypted and encoded in a link) includes one or more of access to read, write, copy, delete, move, rename, and annotate, for example. In some examples, an access rights control 506 is provided for selecting any one or more accessing rights.

One or more access rights are in some embodiments shared or withheld by default in connection with the restricted content selected in the client study user interface window 400. In one example, read access is shared by default, and write access is withheld by default (e.g. according to an IT policy file).

In some embodiments, user interface window 500 does not include access rights controls 506. In some examples, the access rights that are selected or withheld is determined automatically based on one or more of stored access right defaults, an IT policy file, the recipient entered into recipient entry field 502, the time window selected using time window control 504, the selected restricted content, and the selected type(s) of restricted content (e.g. an image, an address, or a diagnosis).

In some embodiments, the sharing or withholding of one or more access rights is fixed and cannot be changed. Access to delete, move and rename the selected restricted content is permanently withheld in one such example.

The access rights that are shared or withheld can be different for each selected item of restricted content, in accordance with some embodiments. In one example, share study user interface window 500 includes one or more access rights controls 506 for each selected item of restricted content. In another example, client study user interface window 400 includes one or more access rights controls (not shown) for each selectable item of restricted content in addition to or instead of check boxes 408.

Share study user interface window 500 is shown including a password text entry field 508. A user can in some embodiments operate an input device to select password text entry field 508 and enter a password. As used herein, and in the claims, a password can be one or more user credentials and/or hashes of user credentials. Examples of user credentials, include but are not limited to, an alphanumeric string (e.g. a combination of letters, number and/or symbols), biometric identifier(s) (e.g. fingerprint image, fingerprint pattern locations, DNA markers, retinal scan image, etc.), and a cryptographic signature. In the example shown, an alphanumeric string is entered or automatically generated in password text entry field 508. In some examples, share study user interface window 500 includes a button (not shown) for choosing an electronic password file (e.g. fingerprint image) representing a biometric identifier or a cryptographic signature. In some examples, share study user interface window 500 includes a button (not shown) for controlling an input device (e.g. a fingerprint reader, retinal scanner, or blood analyzer) to capture the password or information for generating the password.

Share study user interface window 500 is shown including an OK button 510. A user can in some embodiments operate an input device to select OK button 510 to send a share request to server device 106, requesting to share the selected restricted content, and including the access information entered into share study user interface window 500. In the example shown, the share request sent to server device 106 identifies the content selected for sharing, and includes one or more of a recipient, a time window, access right(s), and a password.

In some examples, the password included in the share request is the credential entered, selected, or generated in connection with user interface window 500. In other examples, trusted device 102 hashes the credential entered, selected or generated in connection with user interface window 500 as the password included in the share request. In some cases, including with the share request a password that is a hash of the credential may help protect the original unhashed credential from becoming compromised, e.g. if the share request is intercepted.

At 304, server device 106 encodes a link with encrypted access information, in accordance with some embodiments. In some examples, the link includes a network address. In some cases, the network address corresponds to a device (e.g. server device 106) which can grant access to the selected restricted content. The link in some examples is a uniform resource identifier (URI), formatted as a uniform resource locator (URL) or a uniform resource name (URN).

The encrypted access information includes, in some embodiments, one or more of a time window, a password, an identification of restricted content to be shared, and access rights (each of which applies to all or select portions of the restricted content). In some examples, the password included in the encrypted access information includes one or more credentials and/or hashed credentials. In one example, server device 106 receives in a share request from trusted device 102 a password that is an unhashed credential, and hashes the credential as the password for inclusion in the encrypted access information. This may protect the original unhashed credential from becoming compromised if the encryption applied to the access information is broken (e.g. the cryptographic key is stolen).

In some examples, trusted device 102 encrypts the access information, and includes the encrypted access information with the share request at 302. In other examples, server device 106 encrypts the access information after receiving the share request at 302. In either case, the access information may be encrypted using known symmetric or asymmetric cryptography techniques, and then encoded into the link (e.g. by inserting the encrypted access information into a parameter of the link).

Outside device 104, which in this example is the intended recipient of the encoded link, is not capable of decrypting the access information. In some examples, outside device 104 does not have access to the cryptographic key required to decrypt the access information. This may prevent outside device 104 from determining at least the password included in the access information. This may also prevent outside device 104 from determining other data, such as patient ID, patient name, or study number (which may be included in the access information to identify the restricted content to be shared). As discussed below, outside device 104 can execute the link to request access to the selected restricted content, but access is not granted until outside device 104 provides a password that matches the password contained in the encrypted access information. This may prevent an unscrupulous third-party, who does not know/have the required password, from gaining access to the restricted content using the link.

At 306 the link is communicated to outside device 104 in accordance with some embodiments. In some cases, server device 106 sends the encoded link to trusted device 102 for communicating to outside device 104. In some other cases, (e.g. when a recipient is identified with the share request at 302), server device 106 communicates the link directly to outside device 104.

The link is communicated with outside device 104 directly in some examples. In one example, the link is transmitted from trusted device 102 or server device 106 to outside device 104 by wire or wirelessly (e.g. over network 108). In another example, outside device 104 downloads the link through a direct wired (e.g. USB cable connection) or wireless (e.g. infrared connection) connection with trusted device 102 or server device 106.

The link is communicated with outside device 104 passively in some examples. In one example, the link is displayed on display 110 of trusted device 102, and captured by an image capture device (e.g. camera 112) of outside device 104. In one example, the link is broadcast by wireless communication (e.g. in an encoded wireless signal broadcast over-the-air). In another example, the link is communicated by sound (e.g. as a series of spoken words, spoken characters or encoded tones) which are recorded by a microphone (not shown) of outside device 104.

FOG. 6 shows a screen capture of an example link communicating user interface window 600. In the example shown, the link is encoded as a two-dimensional barcode (e.g. QR Code) 602, and also as a plain text link 604. In some embodiments, the link is alternatively or additionally encoded in another format such as a one-dimensional barcode, an animation or an audio track. In some embodiments, the link is said to be communicated to outside device 104 when image capture device (e.g. camera 112) of outside device 104 captures one or both of two-dimensional barcode 602 and plain text link 604 from display 110 of trusted device 102, or a display (not shown) of server device 106. In some examples, trusted device 102 or server device 106 sends one or both of two-dimensional barcode 602 and plain text link 604 to outside device 104 in a message (e.g. via email, SMS, Facebook™, or Twitter™).

At 308, server device 106 receives an access request from outside device 104 requesting access to the selected restricted content and including the encrypted access information. The encoded link, which includes the encrypted access information, can be executed to send the access request to server device 106.

In some embodiments, the outside device executing the link and sending the access request ("the access requesting device") is not the outside device 104 to whom the link was communicated at 306. In one example, outside device 104 communicates the link to the access requesting device (not shown).

In some embodiments, the link identifies (e.g. in the form of a network address or domain name) the device to whom to send the access request for access to the selected restricted content (the "access gatekeeper device"). In some examples, the access gatekeeper device is server device 106 that originally encoded the link at 304. In other examples, access gatekeeper device is trusted device 102, which sent the share request to share the restricted content at 302, in still another example, the access gatekeeper device is another device (not shown), which may not have participated in requesting or encoding the link.

At 310, in some embodiments access gatekeeper device (e.g. server device 106) receives a password in association with the access request received at 308. The password is separate from the password contained in the access information, an encrypted form of which is included in some examples with the access request at 308.

In some cases, the access requesting device (e.g. outside device 104) includes the password with the access request at 308. In other cases, the access gatekeeper device sends a password request for the password to the access requesting device. In response to the password request, the access requesting device in some examples displays a prompt requesting the user of that device to provide the password, and when provided sends the password to the access gatekeeper device. In other examples, the access requesting device responds to the password request by automatically sending the requested password (e.g. stored by the access requesting device) to the access gatekeeper device without prompting the user and without user input.

At 312, the access gatekeeper device (e.g. server device 106) validates the access request, in accordance with some embodiments. In some embodiments, the access gatekeeper device decrypts the encrypted access information received with the access request at 308. In some examples, the access gatekeeper device determines whether the password received at 310 matches the password contained in the decrypted access information. The access gatekeeper in some examples grants the requested access if the passwords are determined to match and denies the requested access if the passwords are determined not to match.

In some embodiments, the password contained in the decrypted access information includes a hash of a credential. Further, in some examples the access gatekeeper device receives an access request including password that is an unhashed credential at 310. In one such example, determining if the password received in connection with the access request matches the password of the decrypted access information includes the access gatekeeper device hashing the credential of the password of the access request, and comparing the hash with the hashed credential of the password of the decrypted access information.

Alternatively or in addition to determining whether the passwords match, the access gatekeeper device determines, in some examples, whether a time window contained in the decrypted access information is still valid. The time window is said to be valid if it has not expired. In some example, the time window specifies a duration (e.g. 1 hour) starting from a certain reference time (e.g. a specified start time, the time of link encoding, the time the link was sent, or the time of first link execution). In these examples, the time window is valid for the specified duration after the reference time, and invalid any time after that. In some examples, the time window specifies an end time (e.g. a calendar date, optionally including a time of day). In these examples, the time window is valid until the end time, and invalid any time after that. In some examples, the time window specifies a start time (e.g. a calendar date, optionally including a time of day). In these examples, the time window is invalid until the start time, and valid on or after the start time (until an end time if provided).

In some embodiments, after the access gatekeeper device grants the access requesting device (e.g. outside device 104) the requested access, the access remains valid until one or more of the access requesting device disconnects from the access gatekeeper device, the access requesting device logs off of the access gatekeeper device, and the access requesting device stops accessing the selected restricted content for a predetermined continuous period of time (e.g. 15 minutes). In other embodiments, after the access gatekeeper device grants the access requesting device the requested access, the access is revoked when the time window becomes invalid.

In some embodiment, the access granted by the access gatekeeper device to the access requesting device is limited to the access right(s) contained in the decrypted access information. In some examples, the decrypted access information includes access rights specifying read-only access to the selected restricted content. In these examples, the access requesting device is granted read-only access to the selected restricted content.

Many of the above described examples include a trusted device 102 sending server device 106 a share request to share selected restricted content, and server device 106 encoding a link with encrypted access information. In alternative embodiments, trusted device 102 performs the described functions of server device 106. In some examples, trusted device 102 receives a share request to share selected restricted content, e.g. by the user of trusted device 102 selecting OK button 510. In one example, the selection of OK button 510 invokes a program module in trusted device 102 which causes trusted device 102 to encode the link.

Many of the above described examples include communicating the link to outside device 104. In some examples (not shown), the link is communicated to a plurality of outside devices. In one example, a user shares access to restricted content to a plurality of outside devices (e.g. a class of students, a board of directors, or attendees of a conference) by communicating the link to the plurality of outside devices. This may permit access to the restricted content to be granted without storing or managing a plurality of access accounts. In this example, the link can be communicated by projecting the link (e.g. as a two-dimensional barcode or plain text link) onto a screen, by printing the link on posters mounted around a convention hall, and/or by sending the link to the message addresses of registered attendees.

Continuing the example, the access information can include a time window with a start time corresponding to the start time of the class, meeting or conference, and a duration or end time corresponding with the end time of the class, meeting or conference. This may permit the access to the restricted content to be limited to the duration of the class, meeting or conference.

Figure 7:
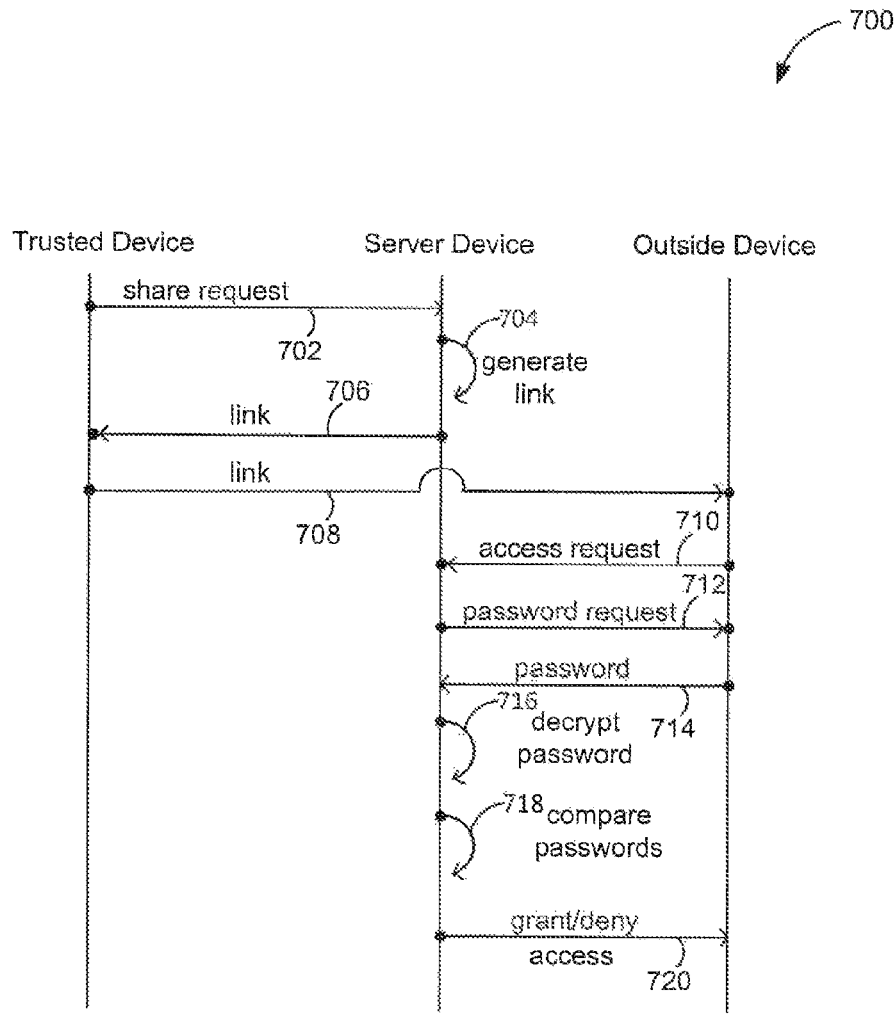
FIG. 7 shows a process flow diagram, which illustrates an example process flow in accordance with at least one embodiment.

FIG. 7 shows a process flow diagram 700, which illustrates an example process flow in accordance with at least one embodiment. At 702, a trusted device sends a share request to share restricted content to a server device. In this example, the share request includes access information such as a password, access rights and an identification of the restricted content to be shared.

At 704, the server device in this example encrypts access information, including the password, access rights and the identification of the restricted content, and generates a link encoded with the encrypted access information. In this example, the link is encoded as a plain-text link, and at 706 returned to the trusted device.

At 708, the trusted device in this example communicates the link to an outside device by encoding the received plain-text link into a two-dimensional barcode, and displaying the two-dimensional barcode which is then captured by a camera of the outside device.

At 710, the outside device in this example executes the link to send the server device an access request to access the restricted content. In this example, the link includes the network address of the server device, and the outside device sends the access request to that address. The access request in this example includes the encrypted access information.

At 712, the server device in this example responds to the access request from the outside device by sending a password request to the outside device. In response, the outside device in this example displays a prompt to the user of the outside device to provide the requested password (e.g. to provide fingerprint information using an attached fingerprint scanner).

At 714, the outside device in this example sends the requested password to the server device. In this example, at 716 the server device decrypts the access information received with the share request at 702, and at 718 compares the password received at 714 with the password contained in the decrypted access information.

At 720, the server device in this example grants the outside device access to the restricted content, identified in the decrypted access information, if the passwords match, and otherwise denies access to the restricted content.

Figure 8:
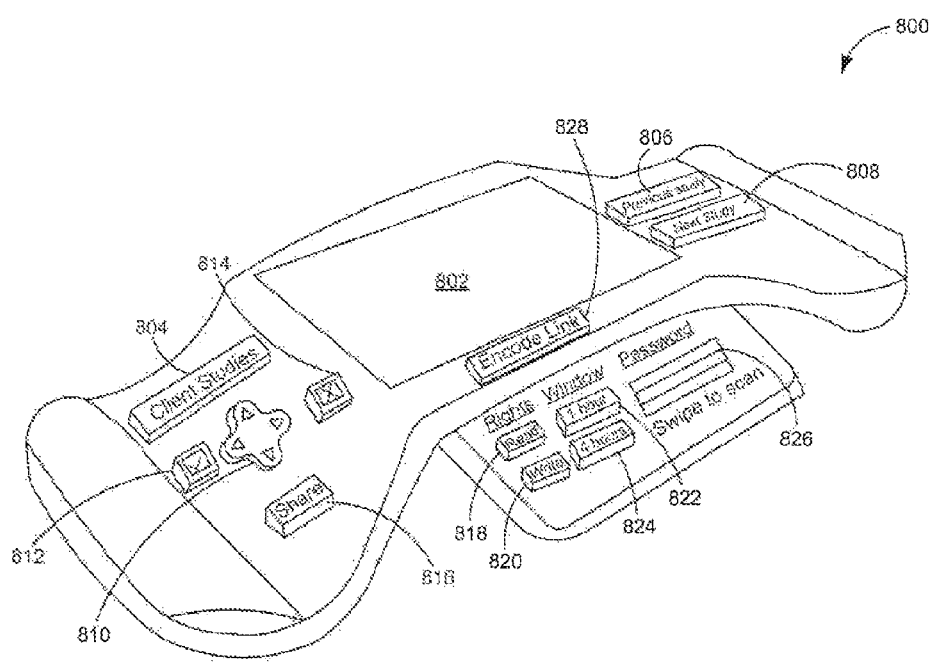
FIG. 8 shows an example of a computing device, in accordance with at least one embodiment.

FIG. 8 shows an example of a computing device 800, in accordance with at least one embodiment. In the example shown, computing device 800 includes computer readable instructions embedded in firmware, which when executed control the hardware of computing device 800 to perform the functionality of both the trusted device 102 and server device 106 described above. In some embodiments, computing device 800 may overcome the practical problems of some existing computing devices which in operation require the creation and management of guest user accounts to provide unregistered users with access to restricted content.

In the example shown, computing device 800 includes a hardware processor (not shown), and a high definition OLEO display 802. The processor executes computer-readable instructions stored in firmware, to control a graphics card (not shown) and display user interface windows 400, 500 and 600, described by way of example above, on display 802.

In some examples, computing device 800 includes a plurality of special purpose buttons, which substitute corresponding interface controls provided in some of user interface windows 400, 500, and 600. Each button is depressible to send a signal to the processor to execute instructions in firmware to control one or more of the hardware components of computing device 800 (e.g. the graphics chip, display 802, a network card etc.)

Client studies button 804 is depressible to display client study user interface window 400 on display 802. With client study user interface window 400 shown on display 802, the user can navigate between a plurality of client study tabs 402 by depressing "Previous Study" button 806, and "Next Study" button 808. Additionally, the user can use navigation rocker 810 to navigate within a study and to interact with user interface controls.

Computing device 800 also includes a selection button 812 and a deselection button 814 for selecting and deselecting restricted content, displayed on display 802, for sharing. Once the restricted content for sharing has been selected, the user can depress share button 816 to display share study user interface window 500 on display 802.

With share study user interface window 500 displayed on display 802, a user can depress access rights buttons 818 and 820 to select access rights to share in connection with the selected restricted content. The user can also depress time frame buttons 822 and 824 to identify a time window as a duration from the time of link encoding. Computing device 800 also includes a fingerprint scanner 826 which can capture the fingerprint of the intended link-recipient, for use as a password to be included in the access information.

After the access rights, time window, and password have been provided, the user can depress the encode link button 828 to send computing device 800 a share request to share the selected restricted content. In response to the share request, computing device 800 executes instructions in firmware to first, encrypt access information identifying the selected restricted content and containing the provided access rights, time window, and password; and second, encode a link including a network address of the computing device 800 and the encrypted access information.

After encoding the link, computing device 800 displays link communicating user interface window 600 on display 802. An outside device can capture the two-dimensional barcode link 602 and execute the link to send computing device 800 an access request requesting access to the restricted content and including the encrypted access information. The computing device 800 responds to the access request according to instructions in firmware by sending a password request to the outside device requesting a password. When the outside device returns the requested password, the computing device 800 decrypts the access information received with the access request and compares the password therein with the received password. If the passwords match, and the time window contained in the access information is still valid, then computing device 800 grants the outside device access to the restricted content identified by the access information.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A computing device for securely sharing restricted content, the computing device comprising:
    a memory storing computer readable instructions; and
    one or more processors configured to execute the computer readable instructions,
    the computer readable instructions configuring the one or more processors to collectively:
        receive a share request to share the restricted content;

in response to the share request, encode a link with encrypted access information, the access information including a first password and the access information identifying the restricted content;

receive an access request for access to the restricted content from a client device executing the link, the access request including the encrypted access information;

receive a second password from the client device in association with the access request; and grant the client device access to the restricted content in response to determining that the first password matches the second password, wherein the encrypted access information includes one or more access rights for the restricted content, and the access is limited to the one or more access rights.

2. The computing device of claim 1, wherein:

determining that the first password matches the second password comprises:

decrypting the first password from the encrypted access information received in the access request; and comparing the decrypted first password to the second password.

3. The computing device of claim 1, wherein determining that the first password matches the second password comprises:

decrypting the first password from the encrypted access information received in the access request;

hashing the second password to generate a second password hash; and comparing the decrypted first password to the second password hash.

4. The computing device of claim 1, wherein configuring the one or more processors to collectively grant the client device the access comprises configuring the one or more processors to collectively:

decrypt the one or more access rights from the encrypted access information received in the access request; and grant the client device the access limited to the decrypted one or more access rights.

5. The computing device of claim 1, wherein:

the encrypted access information defines a time window; and the access is limited to the time window.

6. The computing device of claim 5, wherein the computer readable instructions further configure the one or more processors to collectively:

revoke the granted access upon expiry of the time window.

7. The computing device of claim 5, wherein configuring the one or more processors to collectively grant the client device the access comprises:

configuring the one or more processors to collectively grant the client device access to the restricted content in response to determining, both of the first password matches the second password, and the time window is still valid.

8. The computing device of claim 1, wherein the computer readable instructions further configure the one or more processors to collectively:

communicate the link to the client device.

9. The computing device of claim 1, wherein:

the link is a two dimensional bar code.

10. A non-transitory computer-readable medium comprising instructions executable by one or more processors, wherein the instructions when executed configure the one or more processors to collectively:

receive a share request the restricted content;

in response to the share request, encode a link with encrypted access information, the access information including a first password and the access information identifying the restricted content;

receive an access request to the restricted content from a client device executing the link, the access request including the encrypted access information;

receive a second password from the client device in association with the access request; and grant the client device access to the restricted content in response to determining that the first password matches the second password, wherein the encrypted access information includes one or more access rights for the restricted content, and the access is limited to the one or more access rights.

11. The non-transitory computer-readable medium of claim 10, wherein determining that the first password matches the second password comprises:

decrypting the first password from the encrypted access information received in the access request; and comparing the decrypted first password to the second password.

12. The non-transitory computer-readable medium of claim 10, wherein determining that the first password matches the second password comprises:

decrypting the first password from the encrypted access information received in the access request;

hashing the second password to generate a second password hash; and comparing the decrypted first password to the second password hash.

13. A method of securely sharing restricted content, the method comprising:

receiving a share request the restricted content;

in response to the share request, encoding a link with encrypted access information, the access information including a first password and the access information identifying the restricted content;

receiving an access request to the restricted content from a client device executing the link, the access request including the encrypted access information;

receiving a second password from the client device in association with the access request; and granting the client device access to the restricted content in response to determining that the first password matches the second password, wherein the encrypted access information includes one or more access rights for the restricted content, and the access is limited to the one or more access rights.

14. The method of claim 13, wherein:

determining that the first password matches the second password comprises:

decrypting the first password from the encrypted access information received in the access request; and comparing the decrypted first password to the second password.

15. The method of claim 13, wherein:

determining that the first password matches the second password comprises: decrypting the first password from the encrypted access information received in the access request; hashing the second password to generate a second password hash; and comparing the decrypted first password to the second password hash.

16. The method of claim 13, wherein granting the client device the access comprises:
decrypting the one or more access rights from the encrypted access information received in the access request; and
granting the client device the access limited to the decrypted one or more access rights.

17. The method of claim 13, wherein:
the encrypted access information defines a time window; and
the access is limited to the time window.

18. The method of claim 17, further comprising:
revoking the granted access upon expiry of the time window.

19. The method of claim 17, further comprising:
configuring the one or more processors to collectively grant the client device access to the restricted content in response to determining, both of
the first password matches the second password, and
the time window is still valid.

20. The method of claim 13, further comprising:
communicating the link to the client device.

* * * * *